US009158959B2

(12) United States Patent
Macho

(10) Patent No.: US 9,158,959 B2
(45) Date of Patent: Oct. 13, 2015

(54) PALM IDENTIFICATION AND IN-PLACE PERSONALIZED INTERACTIVE DISPLAY

(71) Applicant: MOTOROLA SOLUTIONS, INC, Schaumburg, IL (US)

(72) Inventor: Dusan Macho, Arlington Heights, IL (US)

(73) Assignee: MOTOROLA SOLUTIONS, INC., Schaumburg, IL (US)

(*) Notice: Subject to any disclaimer, the term of this patent is extended or adjusted under 35 U.S.C. 154(b) by 58 days.

(21) Appl. No.: 13/943,953

(22) Filed: Jul. 17, 2013

(65) Prior Publication Data

US 2015/0023567 A1    Jan. 22, 2015

(51) Int. Cl.
| | |
|---|---|
| *G06K 9/00* | (2006.01) |
| *G06F 3/0484* | (2013.01) |
| *G06F 21/32* | (2013.01) |
| *G06F 21/36* | (2013.01) |
| *G06F 3/01* | (2006.01) |
| *G06F 3/03* | (2006.01) |
| *H04L 29/06* | (2006.01) |

(52) U.S. Cl.
CPC ............ *G06K 9/00087* (2013.01); *G06F 3/017* (2013.01); *G06F 3/0304* (2013.01); *G06F 3/0484* (2013.01); *G06F 21/32* (2013.01); *G06F 21/36* (2013.01); *G06K 9/00013* (2013.01); *H04L 63/0861* (2013.01); *H04L 63/0892* (2013.01); *G06K 9/00* (2013.01)

(58) Field of Classification Search
CPC ......... G06F 3/011; G06F 3/048; G06F 3/017; G01C 21/3664; H04W 4/206; H04W 4/02; G09B 5/065; H04N 21/44222; H04L 63/0428; H04L 63/08; H04L 63/0861; G07C 9/00158; G06Q 30/0261; G05G 9/047; G06K 19/0716; G02B 2027/014
USPC ......... 345/158, 174, 700, 156, 173, 175, 178; 382/115
See application file for complete search history.

(56) References Cited

U.S. PATENT DOCUMENTS

| | | | |
|---|---|---|---|
| 6,456,275 B1 * | 9/2002 | Hinckley et al. | 345/156 |
| 6,779,042 B1 * | 8/2004 | Kloba et al. | 709/248 |

(Continued)

OTHER PUBLICATIONS

International Search Report Dated Dec. 2, 2014 Counterpart to PCT/US2014/046331.

(Continued)

*Primary Examiner* — Vu Le
*Assistant Examiner* — Aklilu Woldemariam
(74) *Attorney, Agent, or Firm* — Daniel R. Bestor

(57) ABSTRACT

A user is identified and an in-place personalized interactive display provided by detecting, via a first imaging system, one or more unique characteristics of a user's palm, identifying the user via the one or more unique characteristics and a database containing mappings between detectable unique characteristics and user identities, retrieving user-specific interactive content as a function of the identity of the user, projecting, via a second imaging system, the user-specific interactive content onto the user's palm, and detecting, via a third imaging system, a user's interaction with the projected user-specific interactive content. The user may be identified by transmitting the one or more unique characteristics to a remote authentication server and receiving, in response, an identity of the user. User-specific content as a function of the identity of the user may be retrieved from a remote interactive content server.

20 Claims, 7 Drawing Sheets

(56) References Cited

U.S. PATENT DOCUMENTS

| | | | |
|---|---|---|---|
| 8,264,325 B2 | 9/2012 | Fukuda et al. | |
| 8,265,347 B2 | 9/2012 | Zhang et al. | |
| 8,380,995 B1* | 2/2013 | Paul | 713/186 |
| 8,514,240 B2* | 8/2013 | Suzuki et al. | 345/591 |
| 2002/0089412 A1 | 7/2002 | Heger et al. | |
| 2004/0140988 A1 | 7/2004 | Kim et al. | |
| 2004/0239628 A1* | 12/2004 | Dietz | 345/163 |
| 2006/0078170 A1* | 4/2006 | Kamata et al. | 382/115 |
| 2007/0216660 A1 | 9/2007 | Sposato et al. | |
| 2008/0271224 A1* | 11/2008 | Wilbert et al. | 2/161.1 |
| 2009/0254962 A1* | 10/2009 | Hendricks et al. | 725/116 |
| 2010/0043119 A1* | 2/2010 | Kim | 2/161.2 |
| 2010/0097324 A1* | 4/2010 | Anson et al. | 345/173 |
| 2011/0291988 A1 | 12/2011 | Bamji et al. | |
| 2012/0017147 A1 | 1/2012 | Mark | |
| 2012/0060127 A1* | 3/2012 | Ilmonen | 715/863 |
| 2012/0127069 A1* | 5/2012 | Santhiveeran et al. | 345/156 |
| 2012/0162140 A1 | 6/2012 | Lee et al. | |
| 2012/0169584 A1* | 7/2012 | Hwang | 345/156 |
| 2012/0182296 A1* | 7/2012 | Han | 345/419 |
| 2012/0218231 A1 | 8/2012 | Slaby et al. | |
| 2012/0230551 A1* | 9/2012 | Hama et al. | 382/115 |
| 2012/0235938 A1 | 9/2012 | Laubach | |
| 2012/0249409 A1* | 10/2012 | Toney et al. | 345/156 |
| 2013/0170717 A1* | 7/2013 | Yabuki | 382/115 |
| 2013/0294658 A1* | 11/2013 | Kamata et al. | 382/115 |
| 2014/0078086 A1* | 3/2014 | Bledsoe et al. | 345/173 |

OTHER PUBLICATIONS

Kurien Zachria et al; "Modeling Gesture Based Ubiquitous Applications", The International Journal of Multimedia &Its Applications, vol. 3, No. 4, Nov. 30, 2011, pp. 27-36, XP055150918.

Clarc Boyd: "Sixthsense Blurs Digital and the Real" Apr. 14, 2009, XP055150917, Retrieved From the Internet: URL: http://news.bbc.co.uk/2/hi/technology/7997961.stm.

* cited by examiner ns, they have found it necessary to carry around numerous keys, security cards, and payment cards and to memorize numerous usernames and passphrases (and/or PINs) to allow them to open doors to their automobile and houses, make payments at retail locations, identify and authenticate themselves, pick up pre-ordered items such as concert tickets, and many other personal chores reliant on such keys and cards. New keys, cards, usernames, and passphrases are constantly being added into this collection as new locks, payment systems, and authentication systems are put into service. As a result, finding the right key, card, and/or usernames and passphrases to gain access to a secured area or secured system, make a payment, pick up items, or perform other routine tasks has become difficult.

PALM IDENTIFICATION AND IN-PLACE PERSONALIZED INTERACTIVE DISPLAY

BACKGROUND OF THE INVENTION

As people have become more security conscious, they have found it necessary to carry around numerous keys, security cards, and payment cards and to memorize numerous usernames and passphrases (and/or PINs) to allow them to open doors to their automobile and houses, make payments at retail locations, identify and authenticate themselves, pick up pre-ordered items such as concert tickets, and many other personal chores reliant on such keys and cards. New keys, cards, usernames, and passphrases are constantly being added into this collection as new locks, payment systems, and authentication systems are put into service. As a result, finding the right key, card, and/or usernames and passphrases to gain access to a secured area or secured system, make a payment, pick up items, or perform other routine tasks has become difficult.

Accordingly, a need exists for a simplified authentication and in-place personalized interactive system that makes it possible for a user to easily open locks and/or gain entry to secured systems, make payments, pick up pre-ordered items, and perform other tasks without having to carry separate keys and/or cards or memorize numerous usernames and passphrases.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
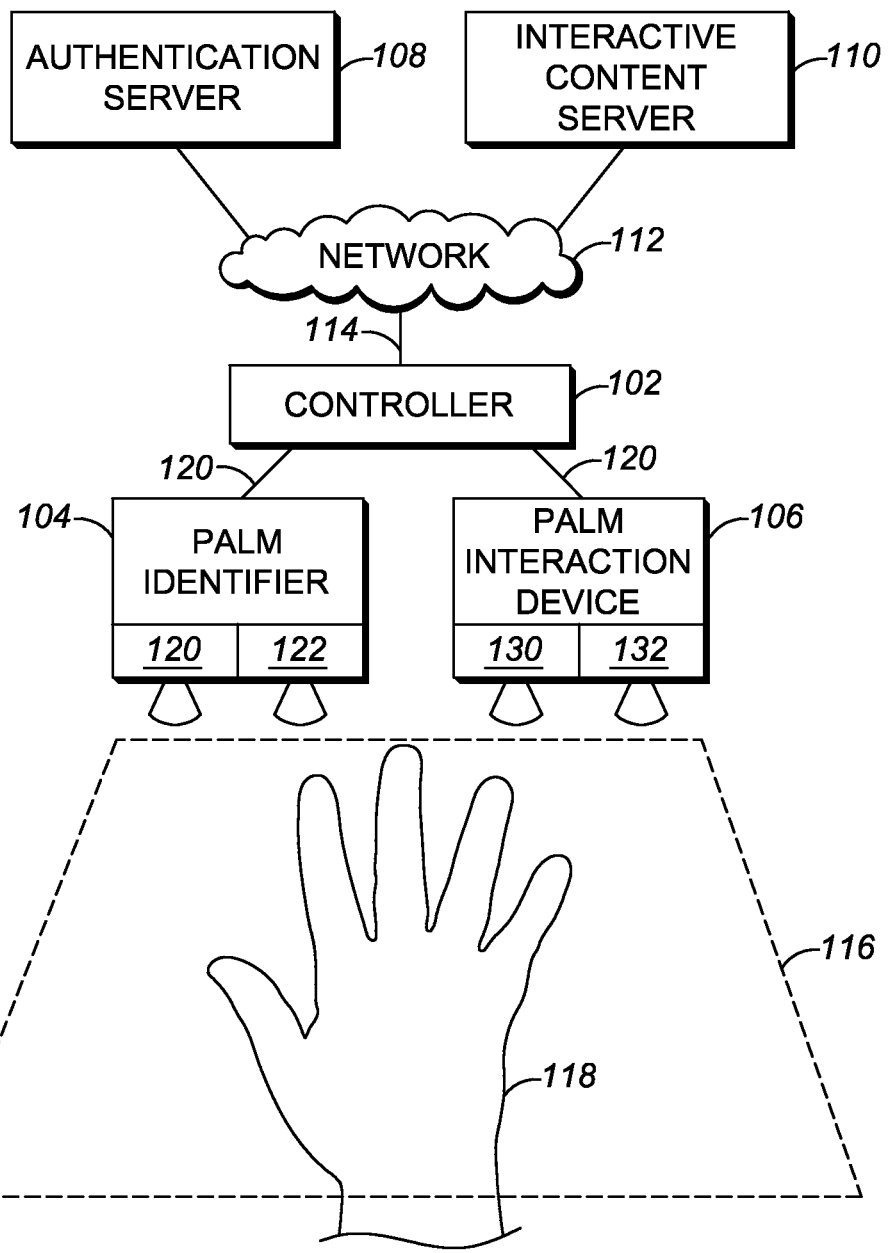
FIG. 1 is a block diagram of a palm identification and in-place personalized interactive display system in accordance with an embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed is an improved method, system, and device for providing a simplified authentication and in-place personalized interactive system that makes it possible for a user to easily open locks and/or gain entry to secured systems, make payments, pick up pre-ordered items, and perform other tasks without having to carry separate keys and/or cards or memorize numerous usernames and passwords.

In accordance with a first embodiment, a user is identified and an in-place personalized interactive display provided by detecting, via a first imaging system, one or more unique characteristics of a user's palm, identifying the user via the one or more unique characteristics and a database containing mappings between detectable unique characteristics and user identities, retrieving user-specific interactive content as a function of the identity of the user, projecting, via a second imaging system, the user-specific interactive content onto the user's palm, and detecting, via a third imaging system, a user's interaction with the projected user-specific interactive content.

In accordance with a second embodiment, a controller for identifying a user and providing an in-place personalized interactive display includes: a transceiver, a memory, first, second, and third imaging systems, and a processor configured to: detect, via the first imaging system, one or more unique characteristics of a user's palm, identify the user via the one or more unique characteristics and a database containing mappings between detectable unique characteristics and user identities, retrieve, via the transceiver, user-specific interactive content as a function of the identity of the user, project, via the second imaging system, the user-specific interactive content onto the user's palm and detect, via the third imaging system, a user's interaction with the projected user-specific interactive content.

Each of the above-mentioned embodiments will be discussed in more detail below, starting with example system and device architectures of the system in which the embodiments may be practiced, followed by a discussion of simplified authentication and in-place personalized interactive display from a system perspective. Further advantages and features consistent with this disclosure will be set forth in the following detailed description, with reference to the figures.

I. System and Device Architectures

Referring now to FIG. 1, an example of a palm identification and in-place personalized interactive display system 100 in accordance with an embodiment is illustrated. As shown in FIG. 1, a palm identification and in-place personalized interactive display system 100 may include a controller 102, a palm identification device 104, a palm interaction device 106, an authentication server 108, an interactive content server 110, a network 112, a palm imaging area 116, and a user's palm 118.

The controller 102 interfaces with and controls the palm identification device 104 and palm interaction device 106, and has access to the authentication server 108 and the interactive content server 110 via network 112 to provide the palm identification and in-place personalized interactive display functionality disclosed herein. The structure of controller 102 will be described in more detail with respect to FIG. 2.

The controller 102 may communicate with remote servers 108, 110 via a connection 114 and network 112. Connection 114 may be a wired and/or wireless link. A wired link may include, for example, a parallel bus or a serial bus such as a Universal Serial Bus (USB). A wireless link may include, for example, Bluetooth, IEEE 802.11, Cellular (such as GSM, CDMA, UMTS, EV-DO, WiMAX, or LTE), or ZigBee, among other possibilities. Network 112 may comprise one or more base stations, routers, switches, LANs, WLANs, WANs, access points, or other network infrastructure. For example, remote servers 108, 110 may be accessible via the Internet, and each remote server 108, 110 may comprise a computing cluster associated with a particular service.

The Authentication server 108 may comprise identity information mapped to user's palm characteristics, for example information detectable via palm identification device 104, such that a request for an identity accompanied by one or more unique characteristics of a particular user's palm can be referenced against the mappings and produce a unique identity of a user associated with those characteristics. Information stored at the authentication server 108 may be encrypted, and communications between the authentication server 108 and client requesting devices may be encrypted as well. Additional information associated with user identities may also be stored at authentication server 108, including for example, financial information including bank account or credit card information and user address or phone information, among other possibilities. The authentication server 108 may be owned by and/or under control of a financial institution, third party identity company, or the owner of the establishment employing the palm identification and in-place personalized interactive display system 100, among other possibilities.

The interactive content server 110 may comprise interactive content, at least some of which is mapped to a particular user identity. Accordingly, a request for interactive content including a user's identity can be responded to with requested interactive content unique to the user. Example interactive content may include a challenge/response pair that may be used to confirm an identity established via the authentication server 108, to confirm a prior, current, or future purchase, or provide some other function. For example, interactive content may include a keypad display. Each piece of interactive content may include user input "action areas" that can be activated via further detected user interaction with the displayed interactive content, perhaps detected via palm interaction device 106. In the example of the keypad display, each key of the keypad may be an "action area" that allows the user to further interact with the interactive content. As an example, the user may be allowed to enter the numeric key sequence "1 2 3 4" via a sequential touch of the projected key images 1, 2, 3, and 4 via a pointer device such as a finger of his or her other hand (e.g., other than the one on which the interactive content is being displayed).

Additional information to display or functions to perform as a result of a user's activation of such "action areas" may be included with the response to the original request, or may be provided upon subsequent requests based on the detected user action. For example, upon entrance of the numeric key sequence above and activation of an enter key action area, the interactive content provided to the controller 102 via the interactive content server 110 may cause the controller to provide the numeric key sequence to one of the authentication server 108 or the interactive content server 110 to further confirm the identity of the user or authorize a particular transaction, among other possibilities.

Other types of interactive content may also include advertisements or coupons tailored to a particular user, perhaps based on past purchases made by the identified user or some other characteristic associated with the identified user. Still further, interactive content may include information (e.g., directions or locations) directing an identified user to a particular location within a secured area, such as a seat at a concert or play. Additionally, interactive content may include form information, such as medical, insurance, or liability waiver forms that may be unfilled, partially filled, or fully filled with information associated with the identified user. Other possibilities exist as well.

The interactive content server 110 may be owned by and/or under control of a content provider, a marketing company, an entertainment promoter, an advertising company, a security company/provider, a third party identity company, or the owner of the establishment employing the palm identification and in-place personalized interactive display system 100, among other possibilities. The same entity that owns and/or controls the authentication server 108 may also own and/or control the interactive content server 110, or different entities may own and/or control them. In some embodiments, the authentication server 108 and the interactive content server 110 may be provided by a same single server.

The imaging devices necessary to identify and/or authenticate a user's palm and to provide an in-place personalized interactive display may include palm identification device 104 and palm interaction device 106. While FIG. 1 illustrates palm identification device 104 and palm interaction device 106 being coupled to the controller 102 via local buses 120, in other embodiments, controller 102 and one or both of the palm identification device 104 and palm interaction device 106 may be coupled via a wired or wireless network similar to network 102 and connection 114. Both of the palm identification device 104 and palm interaction device 106 are configured to operate within a palm imaging area 116 to interact with a user's palm 118 when it is placed within the palm imaging area 116. Controller 102 and palm identification device 104 may be configured to detect entry of a user's palm 118 to within the palm imaging area 116 (e.g., and otherwise operate in a low-power mode in which palm interaction device 106 is substantially powered off), or may be configured to respond to a depression of an activation switch or button, or some other input, to transition to a full power "on" state. Other possibilities exist as well.

Palm identification device 104 may include an imaging device 120 and a light source 122. The light source 122 may be a visible spectrum LED light source and imaging device 120 may be, for example, a CCD imaging device or a CMOS imaging device that operates in a visible light region of the electromagnetic spectrum. Palm characteristics imaged in this manner may include one or more of (i) finger width, (ii), length, width, and thickness of a palm area, (iii) texture features of the palm, (iv) principal lines and wrinkles in the palm, (v) point features in the palm, and (vi) other features based on the details of friction ridges on the palm.

In another embodiment, the light source 122 may be a near-infrared spectrum LED light source and imaging device 120 may be a near-infrared CCD or CMOS imaging device that operates in the near-infrared light region of the electromagnetic spectrum. Palm characteristics imaged in this manner may include vein structure and blood flow patterns, among other possibilities.

Palm interaction device 106 may include a depth camera 130 and a projector 132. The depth camera 130 may provide its own illumination source, such as a visible or infrared range LED light source, or a separate light source device may be provided in palm interaction device 106. In some embodiments, the projector may act as a light source for the depth camera 130. The depth camera may also be known as a time of flight camera, which operates by measuring an amount of time for a light signal to travel from the camera to a subject for each point in an image. The projector 132 may be used to project interactive content retrieved from interactive content server 110, and the depth camera 130 used to track a user's interaction with the displayed content (e.g., via "action areas" as described earlier).

Figure 2:
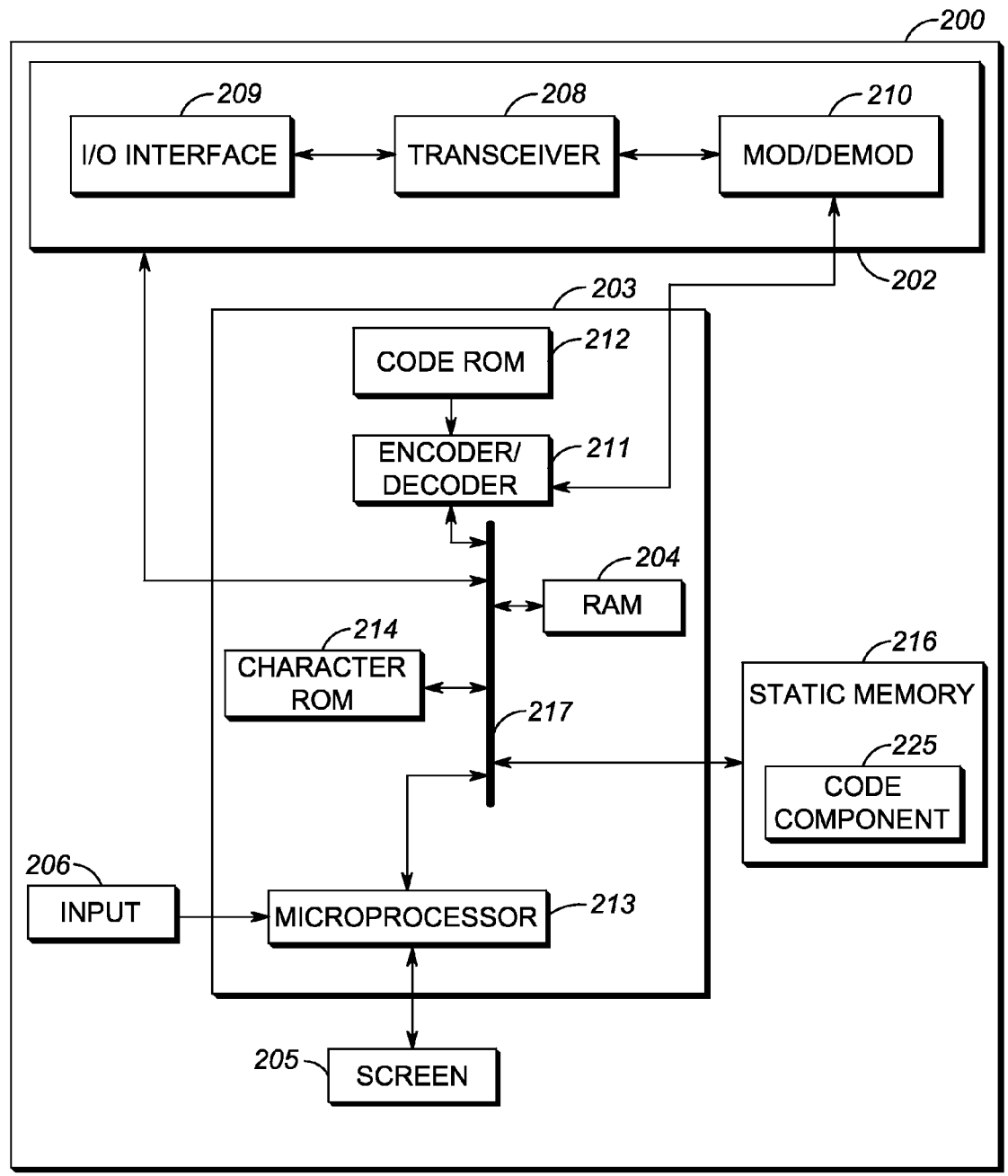
FIG. 2 is a block diagram illustrating an example structure of a controller device in accordance with an embodiment.

FIG. 2 is an example functional block diagram of a controller 200, which may be the same or similar to controller 102 of FIG. 1, and that may operate within the palm identification and in-place personalized interactive display system 100 of FIG. 1. As shown in FIG. 2, controller 200 includes a communications unit 202 coupled to a common data and address bus 217 of a processing unit 203. The controller 200 may also include an input unit (e.g., keypad, pointing device, etc.) 206, and a display screen 205, each coupled to be in communication with the processing unit 203.

The processing unit 203 may include an encoder/decoder 211 with an associated code Read Only Memory (ROM) 212 for storing data for encoding and decoding data, control, and/or other signals that may be transmitted or received between controller 200 and one of palm identification device 104, palm interaction device 106, authentication server 108, and interactive content server 110. The processing unit 203 may further include a microprocessor 213 coupled, by the common data and address bus 217, to the encoder/decoder 211, a character ROM 214, a Random Access Memory (RAM) 204, and a static memory 216.

The communications unit 202 may include one or more wired or wireless input/output (I/O) interfaces 209 that are configurable to communicate with one or more of palm identification device 104, palm interaction device 106, authentication server 108, and interactive content server 110. The communications unit 202 may include one or more wireless transceivers 208, such as a DMR transceiver, an APCO P25 transceiver, a TETRA transceiver, a Bluetooth transceiver, a Wi-Fi transceiver perhaps operating in accordance with an IEEE 802.11 standard (e.g., 802.11a, 802.11b, 802.11g, 802.11n), a WiMAX transceiver perhaps operating in accordance with an IEEE 802.16 standard, and/or other similar type of wireless transceiver configurable to communicate via a wireless network. The communications unit 202 may additionally or alternatively include one or more wireline transceivers 208, such as an Ethernet transceiver, a Universal Serial Bus (USB) transceiver, or similar transceiver configurable to communicate via a twisted pair wire, a coaxial cable, a fiber-optic link or a similar physical connection to a wireline network. The transceiver 208 is also coupled to a combined modulator/demodulator 210 that is coupled to the encoder/decoder 211.

The microprocessor 213 has ports for coupling to the input unit 206 and to the display screen 205. The character ROM 214 stores code for decoding and/or encoding data such as control messages and/or data messages that may be transmitted or received by the controller 200. Static memory 216 may store operating code component 225 for the microprocessor 213 that, when executed, performs one or more of the controller processing steps or message transmissions or receptions as set forth in one or more of FIG. 3 and corresponding text. Static memory 216 may comprise, for example, a hard-disk drive (HDD), an optical disk drives such as a compact disk (CD) drive or digital versatile disk (DVD) drive, a solid state drive (SSD), a flash memory drive, or a tape drive, to name a few.

II. The Process of Palm Identification and In-Place Personalized Interactive Display FIGS. 3-4 set forth example palm identification and in-place personalized interactive display timing diagrams and displays that may be executed in a system such as the system 100 of FIG. 1 in accordance with some embodiments. In the examples set forth in detail below, only particular sequences are disclosed with respect to the system and controller. Of course, additional steps or message transmissions not disclosed herein could be additionally added before, after, or in-between steps or message transmissions or receptions disclosed in FIG. 3, and the presence of such additional steps or message transmissions or receptions would not negate the purpose and advantages of the palm identification and in-place personalized interactive display of this disclosure.

Figure 3:
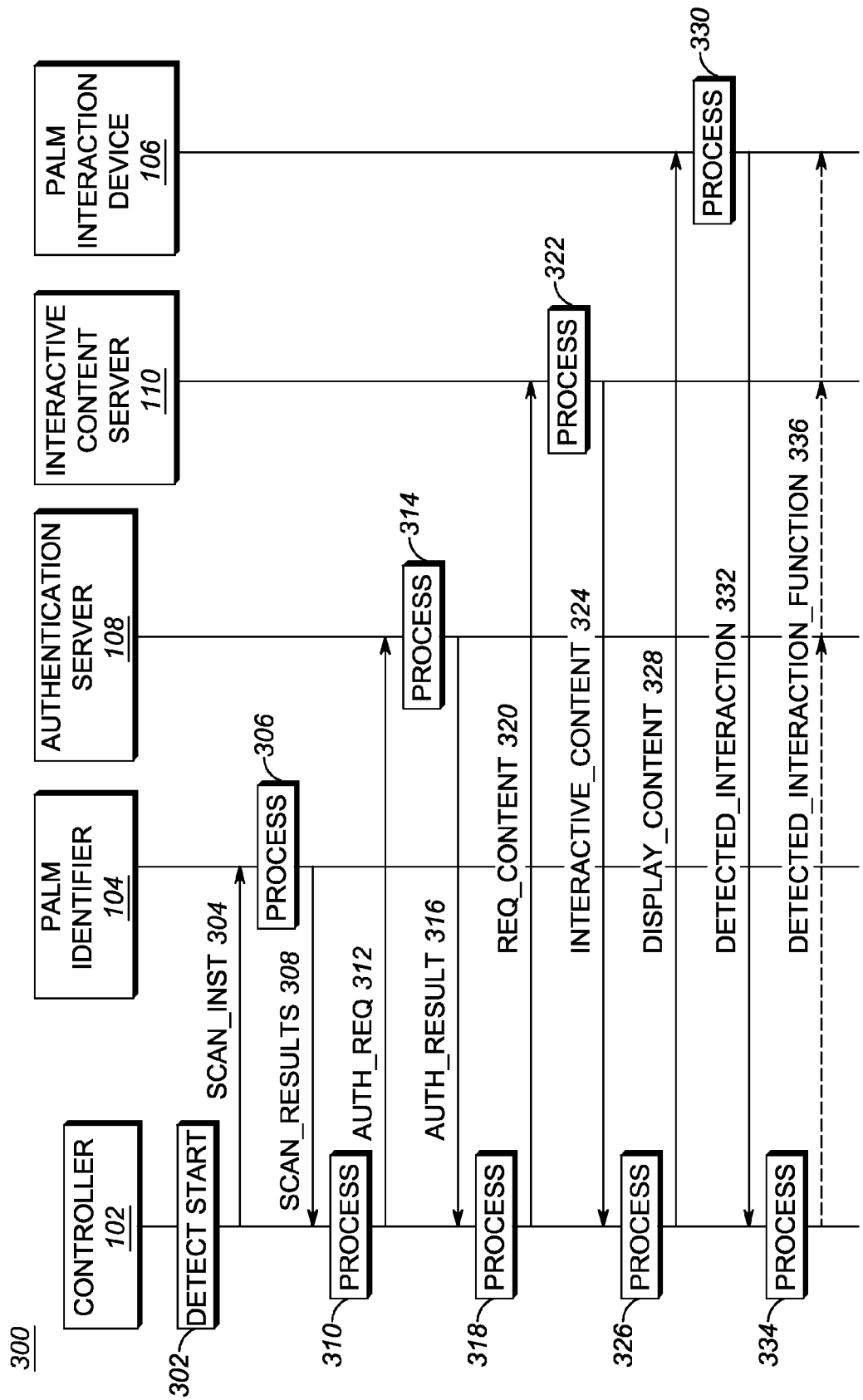
FIG. 3 is a timing diagram illustrating an example palm identification and in-place personalized interactive display process in accordance with an embodiment.

FIG. 3 sets forth a timing diagram 300 illustrating an example timing of a palm identification and in-place personalized interactive display across controller 102, palm identifier 104, authentication server 108, interactive content server 110, and palm interaction device 106, in accordance with an embodiment. At step 302, the controller 102 detects a start condition to begin scanning a palm of a user. The start condition may be, for example, a detected depression of a (soft or hard) start button at a scanning location within a store, bank, concert venue, medical office, or some other location. In another embodiment, the start condition may be caused by the palm identifier 104 detecting entry of an object to within its viewing range (e.g., palm imaging area 116 of FIG. 1) and transmitting an object detection signal to controller 102. Other possibilities exist as well.

After detecting a start condition at step 302, controller 102 transmits a scan instruction scan_inst 304 message to the palm identifier 104. At step 306, the palm identifier 104 receives the scan_inst 304 message and responsively takes an image of a user's palm. Palm characteristics from the captured image may be extracted at the palm identifier 104 or at the controller 102. Accordingly, the palm identifier 104 may reply with scanning results via a scan_results 308 message, where the scan_results 308 message includes one or both of the actual image taken of the user's palm (with or without applied image enhancements) and palm characteristics extracted from the image by the palm identifier 104.

At step 310, the controller 102 receives and processes the scan_results 308 message. If the scan_results 308 message did not include palm characteristics, the controller 102 may execute its own algorithms to extract palm characteristics from the image provided in the scan_results 308 message. Alternatively, if the message includes palm characteristics, the controller 102 may simply extract the palm characteristics included in the scan_results 308 message.

Responsive to obtaining palm characteristics, the controller 102 transmits an identification/authentication request message auth_req 312 to authentication server 108, the auth_req 312 message including the obtained palm characteristics. The auth_req 312 message may be encrypted via a synchronous or asynchronous encryption protocol between controller 102 and authentication server 108 in order to prevent interception of the information contained in the auth_req 312 message.

At step 314, the authentication server 108 receives and processes the auth_req 312 message, extracts the palm characteristics from the message, and maps the obtained palm characteristics to a stored identity. The stored identity may be a single piece of information, such as a unique alpha-numeric identifier such as a social security number or some other identifier that uniquely identifies a person associated with the received palm characteristics. In other embodiments, the stored identity may include a set of information, in place of or in addition to the unique identifier, that provides additional information regarding the user associated with the received palm characteristics. Additional information may include financial information, a pre-stored PIN or passphrase confirmation value to confirm a user's identity or desire to make a purchase (or perform some other function), the user's home address and/or phone number, or other information associated with the user or the entity in control of the authentication server 108.

Authentication server 108 responds to the auth_req 312 message with an auth_result 316 message. The auth_result 316 message may be encrypted in a manner similar to the auth_req 312 message. If no identity match is found by authentication server 108, the authentication server 108 may respond with an error code or other value in the auth_result 316 message indicating that no corresponding identity could be found matching the received palm characteristics of the user. In some embodiments, the error code may cause the controller 102 to request, perhaps via a display screen such as screen 205 of FIG. 2, that the user re-try or re-position his or her palm and try again. If an identity match is found by authentication server 108, the authentication server 108 may respond with the identity and/or the set of information associated with the user that matches the received palm characteristics.

At step 318, the controller 102 receives and processes the auth_result 316 message, indicating a corresponding error if an error code is indicated in the message, or otherwise extracting the identity and/or set of information if the match was successful. In embodiments in which the auth_result 316 message included a PIN or passphrase for use by the controller 102 in confirming an identity or desire to purchase something (or perform some other function), controller 102 may proceed straight to step 326 and treat the PIN or passphrase as interactive content for display and interaction with the user.

In an embodiment, the controller 102 uses the identity of the user received in the auth_result 316 message and extracted at step 318 to generate and subsequently transmit an interactive_content 324 request message to interactive content server 110. The interactive_content 324 request message includes the identity of the user retrieved from the authentication server 102. What type of content is being requested via interactive_content 324 request message depends on the configuration of the controller 102 and its purpose at its deployed site. For example, the interactive_content 324 request message may (i) request a PIN or passphrase for use in confirming the identity of the user or in authorizing an intended transaction by the user, (ii) request advertisements or coupons to display that are tailored to an identified user, (iii) request information to confirm that a valid entry permission exists for the identified user (e.g., to a work area or concert) and request information (e.g., direction or locations) to direct the user to a particular location within a secured area (e.g., an assigned work location or a seat at a concert or play), or (iv) may request form information such as medical, insurance, or liability waiver forms that may be unfilled, partially filled, or fully filled with information associated with the identified user. Other possibilities exist as well.

At step 322, the interactive content server 110 receives the request, retrieves the requested information, and replies by transmitting an interactive_content 324 message including one of an error code if the requested information could not be retrieved and the requested interactive content if the requested information could be retrieved. Included in the interactive_content 324 message may be the substantive content requested (images, video, text, vectors, etc.), information on how to display the substantive content (e.g., markup information such as XML including defined "action areas"), and information regarding what actions to take when a particular "action area" is interacted with by the user, among other possible additional information.

At step 326, the controller 102 receives and processes the interactive_content 324 message. If necessary, the controller 102 may process and re-package the content from the interactive_content 324 message to put it into a form that is understandable by the palm interaction device 106. In other embodiments, the controller 102 may simply pass on the contents of the interactive_content 324 message to the palm interaction device 106 with no or minimal processing of the contents of the interactive_content 324 message. The controller 102 then generates and transmits a display_content 328 message to palm interaction device 106 for display to and interaction by the user.

At step 330, the palm interaction device 106 receives and processes the display_content 328 message, and causes an image to be projected onto the hand of the user that is a function of the determined identity of the user and the personalized information received from one or both of the authentication server 108 and the interactive content server 110.

Figure 4A:
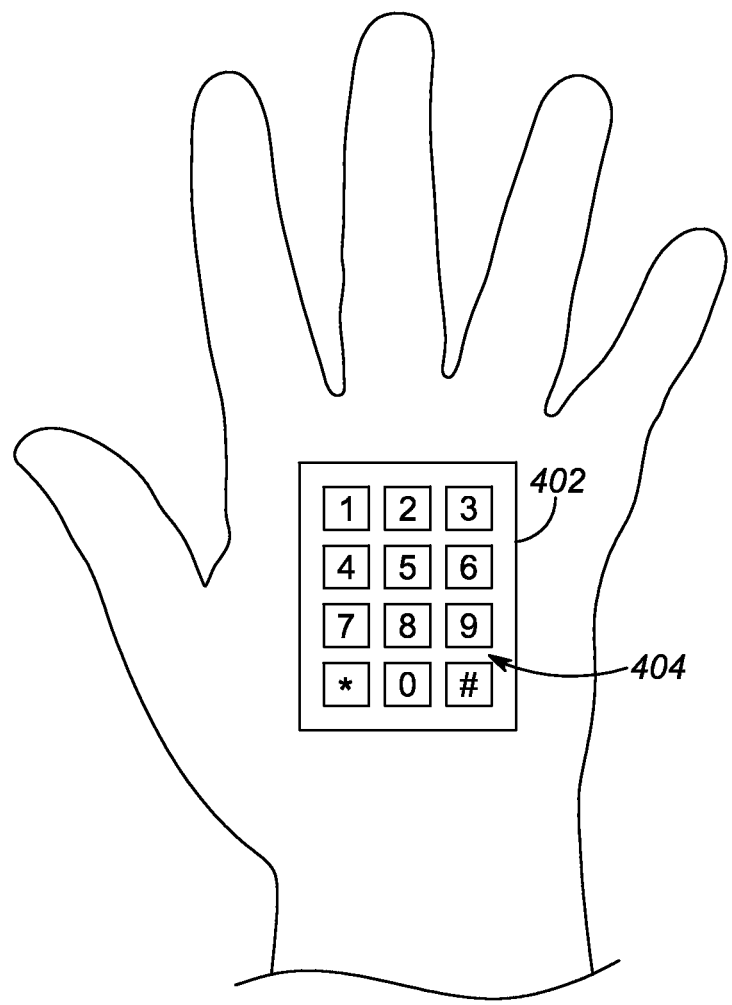
FIGS. 4A-4D illustrate example in-place personalized interactive displays projected as a function of a palm identification in accordance with an embodiment.
Figure 4B:
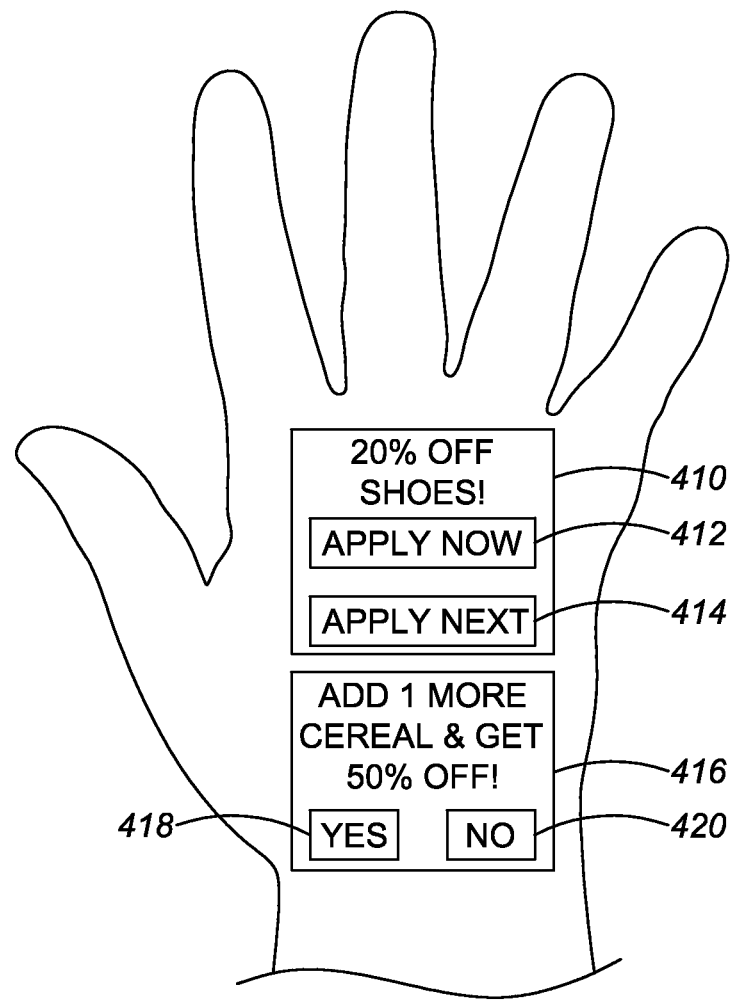

For example, and as shown in FIG. 4A, the palm interaction device 106 may cause a keypad 402 to be displayed on a palm of the identified user's hand, where each of the keys 404 in the displayed keypad 402 is an "action area" that may be selected by the user using a finger or other pointing device on the displayed image. Alternatively, and as shown in FIG. 4B, one or more advertisements or coupons 410, 416 may be displayed on the user's palm. For example, advertisement 410 offers a 20% off coupon that could be either applied to a current order by touching "action area" 412, or saved to the user's account for a future purpose by touching "action area" 414. Advertisement 416 offers a further discount if the user adds an additional item to their purchase, offering a yes "action area" 418 that may be touched by the user to accept the offer and a no "action area" 420 that may alternatively be touched by the user to decline the offer.

Figure 4C:
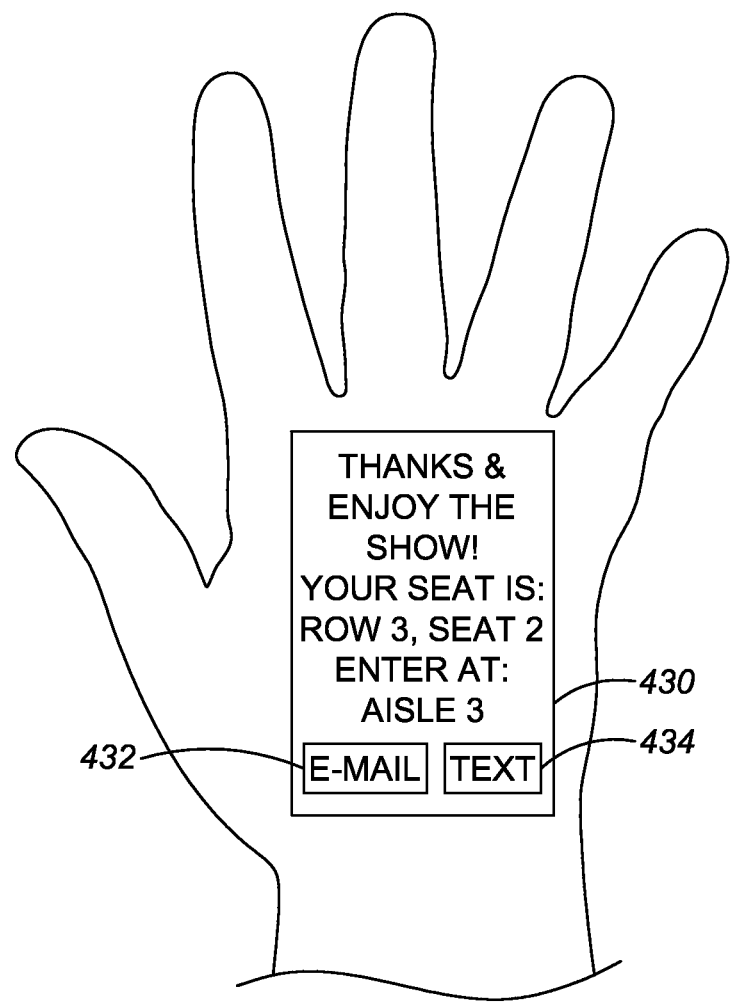

FIG. 4C illustrates a further example in which ticket information 430 regarding a prior ticket purchase associated with the identified user is displayed on the user's palm. The identity of the user could be determined via the palm identifier 104 and associated with the user to allow access to the concert venue, while the palm interaction device 106 is used to remind the user where his or her seat can be found and/or the best path to get to that seat. In addition, "action areas" 432 and 434 may be provided to allow the user to request (by touching a respective "action area") that the displayed information be transmitted to them for future reference (e.g., via e-mail, text, or some other mechanism). In one embodiment, the user's identity may be confirmed via the display and interaction of FIG. 4A before proceeding to the display and interaction of FIG. 4C. Other possibilities exist as well.

Figure 4D:
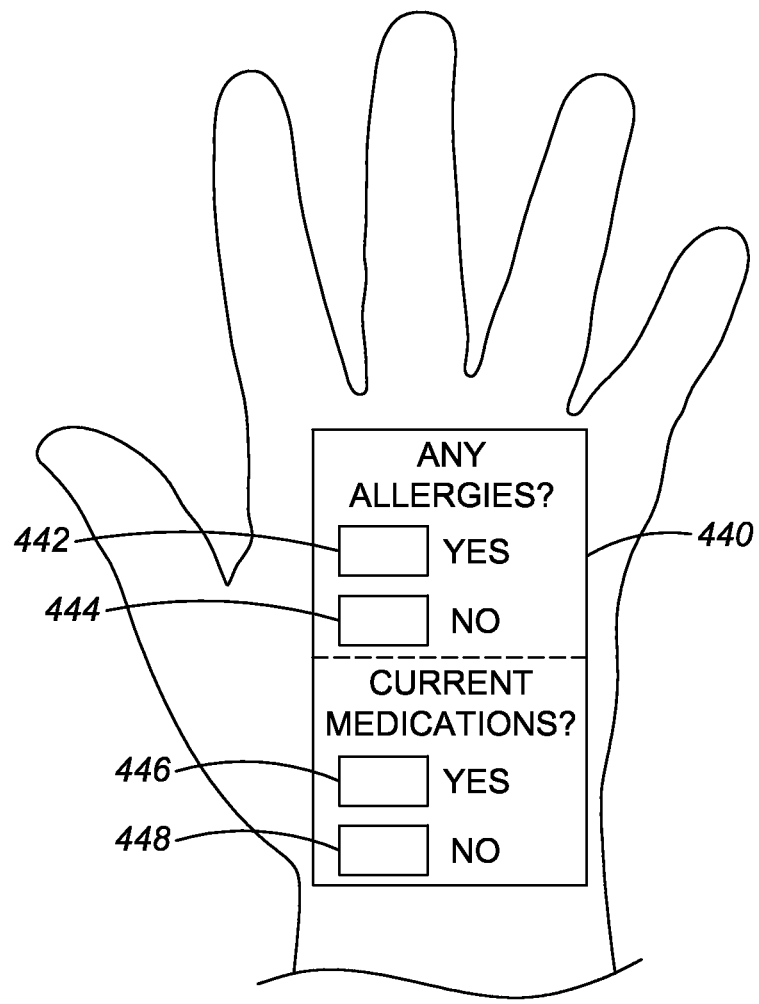

FIG. 4D illustrates still another example in which contents of a medical form 440 are displayed. The medical form 440 may be unfilled, or partially or fully filled with information retrieved from information content server 110 based on the identity of the user. For example, the medical from 440 may be used to confirm the user's symptoms and/or confirm the user's previously provided insurance information. Further, the medical form may request additional medical information to complete a stored medical record, such as requesting whether the user has any allergies (including "action areas" yes 442 and no 444) or whether the user is currently on any medications (including "action areas" yes 446 and no 448. Other information or questions could be displayed as well.

Returning to FIG. 3, at step 330, once the palm interaction device 106 displays the information from the display_content 328 message, it may proceed to detect and send back any and all detected user interaction within the displayed area, or only those interactions detected to be within the "action areas" defined in the display_content 328 message. As shown in FIG. 3, the palm interaction device 106 transmits back a detected_interaction 332 message including detected interactions captured via its depth camera or other imaging device. At step 334, the controller 102 processes the detected_interaction 332 message and takes further steps dependent upon the content of the detected_interaction 332 message. For example, and as shown in FIG. 3, the controller 102 may make further transmissions of requests, instructions, or content to one or more of authentication server 108, interactive content server 110, and/or palm interaction device 106 via the detected_interaction_function 336 message. Further, although only one detected_interaction 332 message is illustrated in FIG. 3, additional detected_interaction 332 messages may be transmitted for further or additional interactions detected by the palm interaction device 106.

For example, and with respect to FIG. 4A, the controller 102 may compare a numerical string included in one or more detected_interaction 332 messages with a stored PIN or passphrase value retrieved from one of the authentication server 108 and the interactive content server 110 to confirm the identity of the user and/or confirm the user's desire to make a current purchase (or perform some other function). If a match is found, the controller 102 may confirm the user's identity and/or allow the transaction to proceed. If a match is not found, the controller 102 may deny the transaction or signal that the user's identity could not be confirmed.

As an additional example, and with respect to FIG. 4B, the controller 102 may compare a selected action area as indicated by the detected_interaction 332 message and, responsive to detecting that action area 414 was selected, store a 20% off coupon to the user's account for future use.

As a still further example, and with respect to FIG. 4C, the controller 102 may compare a selected action area as indicated by the detected_interaction 332 message and, responsive to detecting that action area 432 was selected, transmit an instruction to a mail server to e-mail the displayed information to an e-mail address associated with the user (e.g., perhaps retrieved from one of authentication server 108 and interactive content server 110).

As a final example, and with respect to FIG. 4D, the controller 102 may compare a selected action area as indicated by the detected_interaction 332 message and, responsive to detecting that action area 446 was selected, forward a note to the user's doctor or nurse to confirm what current medications the user is on and/or consider interactions with prescribed medications.

III. Conclusion

Advantageously, by providing a simplified authentication and in-place personalized interactive system that makes it possible for a user to easily open locks and/or gain entry to secured systems, make payments, pick up pre-ordered items, and perform other tasks, users no longer have to carry separate keys and/or cards or memorize numerous usernames and passphrases or worry about losing entry tickets. Instead, simple and in-place identification, and interaction as a function of that identification, can all take place on a user's palm. Other advantages are possible as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method for identifying a user and providing an in-place personalized interactive display, the method comprising:
  capturing, via a first imaging system, an image of a user's palm and detecting, by a controller using the captured image, one or more unique characteristics of the user's palm;
  obtaining, by the controller, an identity of the user via the one or more unique characteristics of the user's palm and a database containing mappings between detectable unique palm characteristics and stored user identities;
  retrieving, by the controller, user-specific interactive content as a function of the identity of the user;
  projecting, by the controller via a second imaging system, the user-specific interactive content onto the user's palm; and
  detecting, by the controller via a third imaging system, a user's interaction with the projected user-specific interactive content on the user's palm.

2. The method of claim 1, wherein the user-specific interactive content comprises a challenge portion of an authentication challenge/response pair.

3. The method of claim 2, further comprising detecting, via the second imaging system, the user's interaction with the user-specific interactive content projected onto the user's palm, and authenticating the user as a function of the detected user's interaction and an authentication database containing expected responses associated with the challenge.

4. The method of claim 3, wherein the first imaging system comprises an image capture device and light source, the second imaging system comprises a projector, and the third imaging system comprises a depth imager.

5. The method of claim 3, wherein the challenge and expected response is retrieved from a remote authentication server via a network.

6. The method of claim 3, further comprising, responsive to authenticating the user, approving a financial transaction associated with the user.

7. The method of claim 3, further comprising, responsive to authenticating the user, allowing the user entry into a secured area.

8. The method of claim 7, further comprising, after authenticating the user, projecting, via the second imaging system, one of directions and a location of where to proceed within the secured area.

9. The method of claim 1, wherein the user-specific interactive content comprises one or more targeted coupons applicable to a current transaction or future transaction associated with the user.

10. The method of claim 9, further comprising detecting, via the third imaging system, the user's interaction with the user-specific content projected onto the user's palm, and based on the detected user's interaction, applying a particular one of a plurality of displayed targeted coupon to a current or future transaction associated with the user.

11. The method of claim 1, wherein the user-specific content comprises a fillable form partially populated with information associated with the identified user.

12. The method of claim 11, further comprising detecting, via the third imaging system, the user's interaction with the user-specific content projected onto the user's palm, and based on the detected user's interaction, storing updated form information including new information provided via the detected user's interaction with the displayed fillable form.

13. A controller for identifying a user and providing an in-place personalized interactive display, the controller comprising:
  a transceiver;
  a memory;
  first, second, and third imaging systems; and
  a processor configured to:
    capture, via the first imaging system, an image of a user's palm and detect, via the captured image, one or more unique characteristics of the user's palm;
    obtain an identity of the user via the one or more unique characteristics of the user's palm and a database containing mappings between detectable unique palm characteristics and stored user identities;
    retrieve, via the transceiver, user-specific interactive content as a function of the identity of the user;
    project, via the second imaging system, the user-specific interactive content onto the user's palm; and
    detect, via the third imaging system, a user's interaction with the projected user-specific interactive content on the user's palm.

14. The controller of claim 13, wherein the user-specific interactive content comprises a challenge portion of an authentication challenge/response pair.

15. The controller of claim 14, the processor further configured to detect, via the second imaging system, the user's interaction with the user-specific interactive content projected onto the user's palm, and authenticate the user as a function of the detected user's interaction and an authentication database containing expected responses associated with the challenge.

16. The controller of claim 13, wherein the user-specific interactive content comprises one or more targeted coupons applicable to a current transaction or future transaction associated with the user.

17. The controller of claim 16, the processor further configured to detect, via the third imaging system, the user's interaction with the user-specific content projected onto the user's palm, and based on the detected user's interaction, apply a particular one of a plurality of displayed targeted coupon to a current or future transaction associated with the user.

18. The controller of claim 13, wherein the user-specific content comprises a fillable form partially populated with information associated with the identified user.

19. The method of claim 1, wherein the detectable unique palm characteristics comprise one or more of (i), length, width, and thickness of a palm area, (ii) texture features of the palm area, (iii) principal lines and wrinkles in the palm area, (iv) point features in the palm area, (v) vein structure in the palm area, and (vi) blood flow patterns in the palm area.

20. The controller of claim 13, wherein the detectable unique palm characteristics comprise one or more of (i), length, width, and thickness of a palm area, (ii) texture features of the palm area, (iii) principal lines and wrinkles in the palm area, (iv) point features in the palm area, (v) vein structure in the palm area, and (vi) blood flow patterns in the palm area.

* * * * *